Patented Oct. 23, 1928.

1,689,014

UNITED STATES PATENT OFFICE.

PAUL DIETERLE, OF BUFFALO, NEW YORK, ASSIGNOR TO NATIONAL ANILINE & CHEMICAL CO., INC., OF NEW YORK, N. Y., A CORPORATION OF NEW YORK.

REDUCTION OF AROMATIC NITRO COMPOUNDS.

No Drawing.   Application filed January 4, 1926.   Serial No 79,270.

This invention relates to the reduction of aromatic nitro bodies for the production of azoxy, azo, hydrazo and amino compounds.

It is well known that mononitro and polynitro aromatic compounds can be reduced to azoxy, azo, hydrazo and amino bodies by the action of sodium or ammonium sulfide under suitable conditions.

The present invention contemplates the reduction of mononitro and polynitro aromatic compounds to azoxy, azo, hydrazo, amino and nitroamino bodies by the action of ferrous sulfide, particularly artificially prepared ferrous sulfide, in neutral or alkaline media and in the presence or absence of miscible or immiscible organic solvents or diluents such as benzene, solvent naphtha, ethyl alcohol, etc. The invention is applicable to the reduction of nitro derivatives of aromatic hydrocarbons and their substitution products, more particularly those of the benzene series.

In carrying out the invention, the nitro compound is dissolved or suspended in any suitable neutral or alkaline medium and heated with ferrous sulfide, preferably artificial ferrous sulfide prepared by precipitation. Diminished, normal or superatmospheric pressures may be used.

The following specific examples will further illustrate the invention, but it is understood that the invention is not limited thereto. The parts are by weight.

*Example 1: 2.4-dinitrophenol to 2.4-aminonitrophenol.*—90 parts of an aqueous solution containing 17 parts of sodium sulfide is added, with stirring, to a solution of 60 parts ferrous sulfate dissolved in 80 parts of water. To the well stirred solution containing precipitated ferrous sulfide thus obtained, there is added 20.6 parts of the sodium salt of 2.4-dinitrophenol dissolved in 160 parts of water, and the mixture heated to a temperature of about 40°–80° C. for one-half to two hours or until the reduction is complete. It is then filtered and the filtrate neutralized by the addition of hydrochloric acid (or other acid), excess of acid being avoided. The precipitated 4-nitro-2-aminophenol is collected in any suitable manner. The product is of excellent quality and obtained in good yields. Other nitrophenols can be reduced in an analogous manner, e. g., picric acid to picramic acid.

*Example 2: Metadinitrobenzene to metanitraniline.*—1 part of metadinitrobenzene and 1 part of ferrous sulfide are suspended in 8 to 10 parts water and the mixture heated to 80°–85° C. for one to two hours or until the reaction is complete. It is then filtered and the metanitraniline extracted from the filter-cake by treatment with solvent naphtha or other suitable solvent. The solvent naphtha solution is treated with hydrochloric acid and after separation from the solvent naphtha it is neutralized with sodium carbonate and the precipitated metanitraniline filtered off, pressed and dried.

*Example 3: Nitrobenzene to aniline.*—To 12 parts of nitrobenzene in about 500 parts of a 3 per cent solution of caustic soda there is added about 12 parts of ferrous sulfide and the mixture is heated to boiling (about 99°–102° C.) under a reflux condenser for about 2 hours or until nitrobenzene is no longer present. The mixture is then steam distilled and the aniline collected in any suitable manner.

*Example 4: Nitrobenzene to azo and hydrazobenzene.*—A mixture of 6 parts nitrobenzene and 4.5 to 6 parts ferrous sulfide in about 15 parts of a 40 to 48 percent solution of caustic soda is heated with stirring at a temperature of about 80°–85° C. for about 2 to 3 hours. This results in the formation of about 20 to 25 percent aniline and 65 to 75 percent of azobenzene based on the nitrobenzene used. The aniline can be removed by steam distillation and the azobenzene recovered from the residue in any suitable manner, e. g., by extraction with benzene. Or, after distilling off the aniline, the mixture can be diluted with water to give about a 20 to 30 percent solution of caustic soda and then further heated to about 70°–80° C. until the azobenzene has been converted to hydrazobenzene. The hydrazobenzene can be recovered by extracting the mixture with benzene.

The reduction with ferrous sulfide is applicable to other nitro compounds such as, for example, nitro-acetyl Cleve's acid to aminoacetyl Cleve's acid, dinitro anthrarufin (or chrysazin)-disulfonic acid to the corresponding diamino-disulfonic acid, etc.

It will thus be seen that nitro compounds can be readily reduced by means of ferrous sulfide; that the time required to carry out the reduction is relatively short and the temperature employed is comparatively low; and that the yields are good and the products of excellent purity. In neutral media, the reaction takes place with formation of sulfur and in alkaline media with formation of a thiosulfate.

I claim:

1. A method of reducing an aromatic nitro compound which comprises subjecting the nitro compound to the action of ferrous sulfide.

2. A method of reducing a nitro derivative of the benzene series which comprises subjecting the nitro derivative to the action of ferrous sulfide.

3. A method of reducing a nitrophenol which comprises subjecting the nitrophenol to the action of ferrous sulfide.

4. A method of reducing an organic nitro compound which comprises inducing a reaction between the nitro compound and ferrous sulfide in the presence of water.

5. A method of reducing an organic nitro compound which comprises subjecting the nitro compound to the action of ferrous sulfide in a non-acid medium.

6. A method of reducing an organic nitro compound which comprises inducing a reaction between the nitro compound, ferrous sulfide, and an aqueous non-acid medium.

7. A method of producing a nitroaminophenol which comprises subjecting a polynitrophenol to the action of ferrous sulfide.

8. A method of producing 4-nitro-2-aminophenol which comprises subjecting 2.4-dinitrophenol to the action of ferrous sulfide in a neutral solution.

9. A method of reducing an aromatic nitro compound which comprises subjecting the nitro compound to the action of ferrous sulfide in the presence of water.

10. A method of reducing a nitro derivative of the benzene series which comprises subjecting the nitro derivative to the action of ferrous sulfide in the presence of water.

11. A method of reducing a nitrophenol which comprises subjecting the nitrophenol to the action of ferrous sulfide in the presence of water.

12. A method of reducing an organic nitro compound which comprises reacting an organic nitro compound and freshly precipitated ferrous sulfide in a non-acid aqueous medium.

13. A method of reducing an organic nitro compound of the benzene series which comprises adding the organic nitro compound to a medium containing freshly precipitated ferrous sulfide.

14. A method of reducing a nitro derivative of the benzene series which comprises reacting ferrous sulfate and sodium sulfide in an aqueous medium and adding the nitro derivative to the resulting reaction product.

15. A process of reducing a nitro derivative of the benzene series which comprises heating to boiling a mixture comprising the nitro derivative and ferrous sulfide in a non-acid aqueous medium.

16. A process of preparing a nitroaminophenol which comprises reacting a polynitrophenol with a mixture comprising water and freshly precipitated ferrous sulfide.

In testimony whereof I affix my signature.

PAUL DIETERLE.